Aug. 2, 1966   F. A. LAPINSKI   3,264,498
CYCLING ELECTRICAL CONTROLLER
Filed Dec. 31, 1962
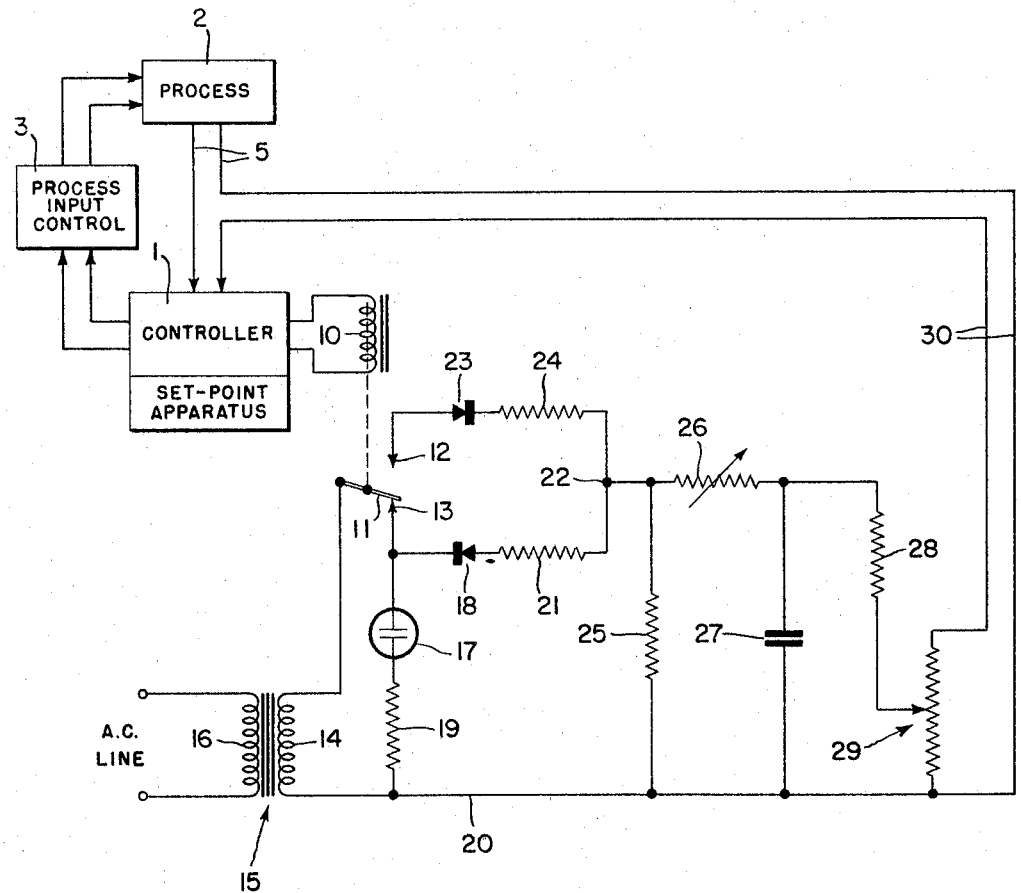
INVENTOR.
FRANCIS A. LAPINSKI
BY Arthur H. Swanson
ATTORNEY.

United States Patent Office 3,264,498
Patented August 2, 1966

3,264,498
CYCLING ELECTRICAL CONTROLLER
Francis A. Lapinski, Philadelphia, Pa., assignor to Honeywell Inc., a corporation of Delaware
Filed Dec. 31, 1962, Ser. No. 248,486
2 Claims. (Cl. 307—127)

This invention relates to process variable controllers. More specifically, the present invention relates to an automatic control apparatus featuring set-point overshoot control.

An object of the present invention is to provide an improved automatic electrical control apparatus for controlling the set-point approach rate of a controlled variable.

Another object of the present invention is to provide an improved electrical control apparatus for automatically controlling a variable on both sides of a set-point.

Still another object of the present invention is to provide an improved electrical control apparatus for providing control of an initial magnitude of an increasing variable with respect to a set-point.

A further object of the present invention is to provide an improved automatic electrical control apparatus, as set forth herein, which is characterized by a simplicity of operation and construction.

In accomplishing these and other objects, there has been provided, in accordance with the present invention, an automatic control apparatus having an automatic controller for sensing the magnitude of a process variable and controlling the process with respect to a set-point magnitude of the variable. A signal circuit is controlled by the controller to provide an initial injection signal for combination with the sensed variable magnitude signal during a set-point approach of the sensed signal. The signal combination is applied to the controller to anticipate the set-point approach of the variable by prematurely providing a controller input signal having a magnitude equal to the set-point. Upon the operation of the controller in response to a set-point magnitude input signal, the signal circuit is arranged to remove the previous injection signal and to substitute a second injection signal having an opposite relationship with the sensed variable signal from that of the initial injection signal and which is effective to change the set-point relation of the sensed signal. The controller is cycled between operating conditions as the first and second injection signals are alternately combined with the sensed signal, and the process variable is controlled with respect to the set-point.

A better understanding of the present invention may be had from the following detailed description when read in connection with the accompanying drawing in which the single figure is a schematic illustration of an automatic electrical control apparatus embodying the present invention.

Referring to the single figure in more detail, there is shown an automatic control apparatus embodying the present invention and comprising a controller 1 for comparing an input signal with a reference, or set-point, signal to produce an output signal representative of the comparison operation. Such devices are well-known in the art and are usually used in an on-off mode of operation. For example, assume a process 2 is arranged to have a variable controlled by a process control 3. The process may be the operation of heating of an oven wherein the process control 3 would be arranged to control the source of energy to the oven. A thermocouple element may be used to sense the temperature of the oven. A pair of wires 5 are used to connect the sensing element to the controller 1. Thus, the controller 1 is used to compare the sensed temperature of the oven with a set-point temperature. The result of this comparison operation is an output signal from the controller 1 which is applied to the process control 3 to control the energy supplied to the process 2. Thus, the supplied energy is shut off when the desired temperature is reached and is turned on when the oven is below the desired temperature.

In this type of operation, the control exercised by the controller is influenced by an operating characteristic of the process known as thermal inertia. This inertia is effective to continue a temperature change after the magnitude of the supplied energy is changed. Further, the control effect is markedly influenced by the time of response of the controller to an input signal change. Thus, in order to arrive at a desired temperature, it is necessary to change the energy supplied to the process before the desired temperature is reached and to allow the thermal inertia to bring the process 2 to the desired set-point. The apparatus of the present invention is effective to provide this anticipating type of control operation by a unique signal injection circuit which is controlled by the effect of the controller 1. This injection circuit is used to provide an injection signal which is introduced into the controller 1 in combination with the signal from the process 2. The augmented input signal to the controller 1 is effective to produce an output signal from the controller 1 prior to the time that the sensed signal from the process 2 would have produced the output signal. For example, the input signal is effective to reach the set-point of the controller 1 to shut off the energy supply to the process 2 before the set-point temperature is actually reached by the process 2. This anticipatory action is effective to allow the thermal inertia of the process 2 to continue the temperature increase of the process 2 up to the set-point temperature. Thus, an increase of the temperature past the set-point, which effect is known as overshoot, is prevented, and the set-point temperature is reached with a minimum of deviation therefrom.

The injection signal circuit is controlled by an output signal from the controller 1 which is applied to a relay coil 10. The relay coil 10 is arranged to move a relay armature 11 between a pair of relay contacts 12 and 13. The unenergized condition of the relay coil 10 is effective to allow the armature 11 to contact the relay contact 13, as shown in the single figure. The armature 11 is connected to one side of a secondary winding 14 of a transformer 15 having a primary winding 16 supplied from an A.C. line. Contact 13 is connected to one side of a neon tube 17 and to the cathode electrode of a diode 18. The other side of the neon tube 17 is connected through a resistor 19 to a common line 20 which is connected to the other side of the secondary winding 14. The anode of diode 18 is connected through a resistor 21 to a common point 22. The other contact 12 is connected to the anode of a diode 23 having its cathode connected through a resistor 24 to the common point 22.

A resistor 25 is used to connect the common point 22 to the line 20. The common point 22 is also connected through a variable resistor 26 to one side of a capacitor 27 and through a resistor 28 to the slider of an output potentiometer 29. The other side of the capacitor 27 is connected to the line 20. The resistance winding of the potentiometer 29 is connected at one end thereof to the line 20 and is, also, interposed in one of the line 5 by a pair of connecting wires 30.

In operation, the present invention is effective to introduce an injection signal to the input of the controller 1 in combination with the sensed signal from the process 2. When the relay armature 11 is in the position shown in the single figure, the A.C. signal across the secondary winding 14 is applied through contact 13 to diode 18. Diode 18 is effective pass only one polarity of the input A.C. signal; i.e., the circuit is a half-wave rectifier. The A.C. signal is also applied to the neon light 17 which light is turned on by this signal. The rectified output of the diode 18 is applied through resistor 21 to an RC circuit comprising resistor 25, variable resistor 26 and capacitor 27. Resistor 26 is a variable element to provide an adjustment of the time constant of the RC circuit. Thus, the capacitor is charged to provide an increasing output signal which is applied across resistor 28 and a portion of potentiometer 29. Potentiometer 29 is used to adjust the amplitude of the portion of the aforesaid output signal which is to be applied to the controller 1 in combination with the sensed signal from the process 2. The adjustment of potentiometer 29 is effective to provide a means for controlling the amount of anticipation provided by the augmented input signal to the controller. This control adjustment is used to adjust the operation of the controller 1 in accordance with the particular thermal inertia exhibited by the process system 2.

Assume the process 2 is starting from a condition below the set-point and the signal supplied by the charging of the capacitor 27 with the relay armature 11 in the position shown in the figure is arranged to increase the sensed signal from the process 2. In this state of the process 2, the controller 1 is effective to permit a supply of energy from the control 3 to the process 2. Accordingly, the energized condition of the neon light 17 is an indication of the application of energy to the process 2. Since the sensed signal from the process 2 is being increased by the signal from the potentiometer 29, the input signal to the controller 1 is effective to reach the set-point level of the controller 1 before the process 2 has actually reached the set-point temperature.

When the set-point of the controller 1 is reached by the augmented input signal, the controller 1 is effective to turn off the energy supply to the process 2 by means of the control 3 and to actuate the relay armature 11 to contact the relay contact 12. In this position of the armature 11, the neon light 17 is deenergized to indicate that the energy supply to the process 2 has been interrupted. The A.C. signal from the secondary winding 14 is now applied to diode 23 which is poled oppositely to diode 18 and is effective to pass the other polarity of the A.C. signal. Since the polarity of the A.C. signal derived from the winding 14 is reversed, the application of the output from diode 23 through resistor 24 to the RC circuit is effective to charge capacitor 27 in the opposite direction from the initial charge polarity. This new polarity of capacitor 27 is effective to supply a signal to potentiometer 29 which is arranged to subtract from the sensed signal from the process 2. If the resultant input to the controller 1 is below the set-point, the controller 1 will turn on the energy to the process and return the armature 11 to the initial position to charge the capacitor 27 to a polarity which will again augment the sensed signal from the process 2. The augmented signal will result in a further operation as described above with the controller 1 turning the energy to the process 2 on and off to maintain the set-point temperature of the process 2.

Thus, it may be seen that there has been provided, in accordance with the present invention, a control apparatus for controlling the initial magnitude of a variable with a minimum of set-point overshoot and the subsequently controlling then variable with respect to the set-point.

What is claimed is:

1. A control system including a controller having an input, set-point means, and an output in which is produced a control signal representative of a difference between the magnitude of a signal applied to said input and a set-point magnitude produced by said set-point means, a signal injection circuit comprising a selectively operable signal gate having a signal input circuit, a first output circuit and a second output circuit, said signal gate having an unenergized condition wherein said input circuit is connected to said first output circuit, circuit means connecting said signal gate to said control signal from said controller for selective energization thereby to connect said input circuit with said second output circuit, alternating current input means connected to said input circuit and arranged to be connected to a source of A.C. power, a first asymmetrically conductive device connected to said first output circuit and arranged to pass a signal having a first polarity, a second asymmetrically conductive device connected to said second output circuit and arranged to pass a signal having a second polarity, a capacitor having one side connected to a return path for said input means, circuit means operative to apply an output signal from said first and second conductive devices to the other side of said capacitor, and other circuit means combining an injection signal developed across said capacitor with a sensed variable signal from a process controlled by said control signal, and applying the combination of said injection signal and said sensed variable signal to said input of said controller.

2. A control system including a controller having an input, set-point means, and an output in which is produced a control signal representative of a difference between the magnitude of a signal applied to said input and a set-point magnitude produced by said set-point means, a signal injection circuit comprising a selectively operable relay having a movable armature, a first contact and a second contact, said relay having an unenergized condition wherein said armature is positioned against said first contact, circuit means connecting said relay to said control signal from said controller for selective energization thereby to move said armature against said second contact, alternating current input means connected to said armature and arranged to be connected to a source of A.C. power, a diode connected to said first contact and arranged to pass a signal having a first polarity, a second diode connected to said second contact and arranged to pass a signal having a second polarity, a capacitor having one side connected to a return path for said input means, circuit means operative to apply an output signal from said first and second diodes to the other side of said capacitor, and other circuit means combining an injection signal developed across said capacitor with a sensed variable signal from a process controlled by said control signal, and applying the combination of said injection signal and said sensed variable signal to said input of said controller.

References Cited by the Examiner

UNITED STATES PATENTS

| 2,426,711 | 9/1947 | Shaffer | 236—74 X |
| 2,477,946 | 8/1949 | Smith | 320—1 |
| 2,745,052 | 5/1956 | Willemse | 320—1 |
| 2,797,291 | 5/1957 | Davis. | |
| 3,048,766 | 8/1962 | Panzer | 307—110 X |

ORIS L. RADER, *Primary Examiner.*

MILTON O. HIRSHFIELD, *Examiner.*

W. M. SHOOP, *Assistant Examiner.*